Oct. 21, 1947.  F. A. WOOLLEY  2,429,285
CUPOLA FURNACE FOR MELTING OF FINELY DIVIDED METAL PARTICLES
Filed Feb. 3, 1945  2 Sheets-Sheet 1

INVENTOR:
FREDERICK ARTHUR WOOLLEY
by Walter S. Bleston
ATTORNEY

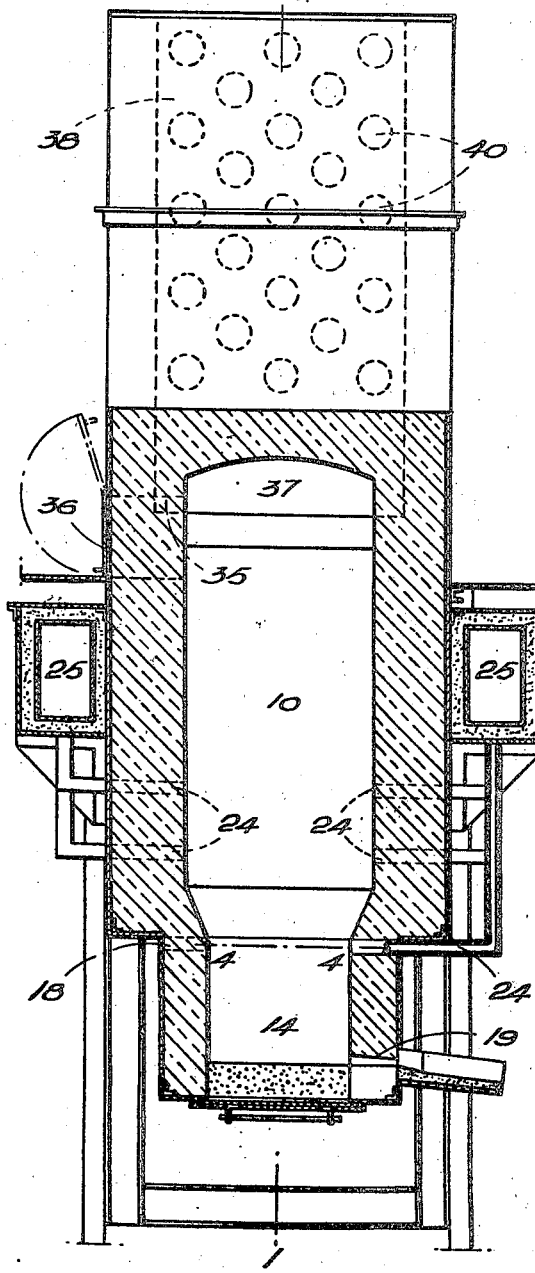
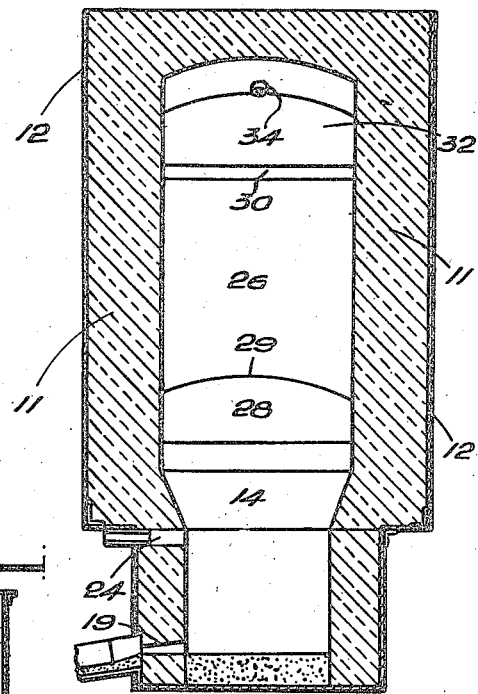
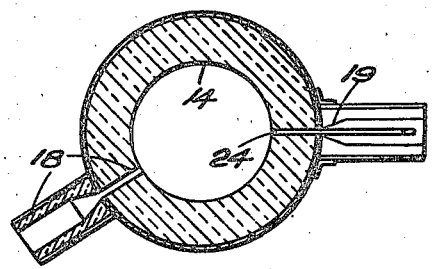

Patented Oct. 21, 1947

2,429,285

UNITED STATES PATENT OFFICE 2,429,285

CUPOLA FURNACE FOR MELTING OF FINELY DIVIDED METAL PARTICLES

Frederick Arthur Woolley, Birmingham, England, assignor to The Midland Motor Cylinder Company Limited, Birmingham, England, a British company Application February 3, 1945, Serial No. 576,062
In Great Britain February 9, 1944

9 Claims. (Cl. 266—33)

1

The invention relates to the melting of finely divided metals such for example as borings, turnings, drillings, and the like; punch trimmings, and flash from metal castings. The divided condition of the metal makes it inconvenient to melt in conventional types of furnaces since the particles tend to pack closely together and have a smothering effect if charged on to a fuel bed.

Owing to this difficulty, such divided metals in scrap or waste form are usually treated to some form of briquetting in a powerful press or packed into containers before being melted, which entails the additional work of the briquetting or packing as well as the handling and transporting of the materials incidental to this step.

If in order to avoid the smothering effect a light layer of the materials is charged loose into an ordinary cupola it is found that the metal particles are liable to be blown out with the escaping combustion gases by the forced draught applied to the cupola. There is also the loss due to oxidation to be considered owing to the presence of free oxygen in the gases. A heavy layer appears effectively to blanket the combustible material in the furnace and melting is prevented.

In accordance with the present invention the metal is charged on to a bed of solid fuel which has been ignited and raised to incandescene by the introduction of air at inlets so distributed as to maintain a suitable depth of fuel bed, and the products of incomplete combustion from this bed are directed so that they sweep beneath the metal charged on to the bed and are conducted to the upper part of the furnace where they are reintroduced, with an appropriate quantity of air to complete combustion, and form a hot upper zone of the furnace above the metal.

Any blanketing effect of a charge of the loose metal to be treated on the gases rising from the fuel bed is thus avoided by the deflection of the gaseous products towards the flue or passage by which they are conducted to the upper zone of the furnace.

A furnace or cupola operating on these principles is illustrated in the appended drawings:

Figure 2 is a section on line 2—2 of Figure 1 looking to the right.

Figure 3 is a section on the sale line of Figure 1 but looking left.

Figure 4 is a horizontal section on line 4—4 of Figure 2 showing the angular position of slag and tapping holes.

2

Figure 1:
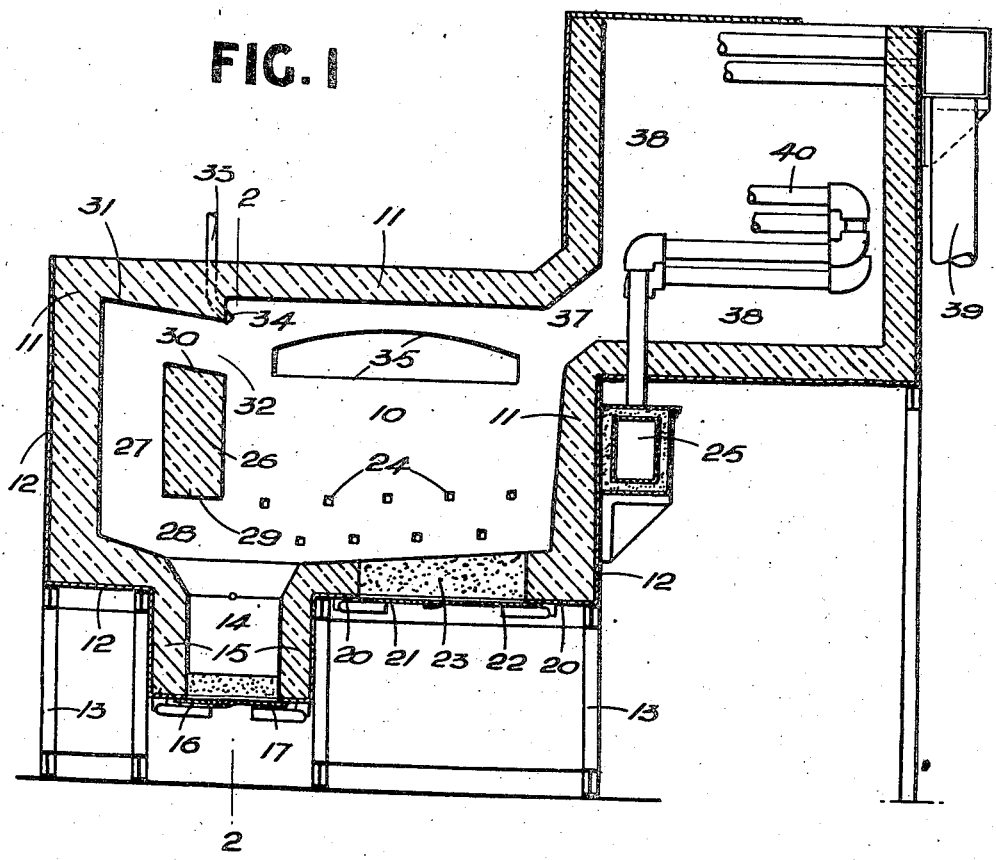
Figure 1 is a vertical section through the furnace or cupola on line 1—1 of Figure 2.

The furnace chamber 10 in this example is of approximately oblong rectangular shape and comprises a refractory lining 11 for its side and end walls within a steel or other metal shell or casing 12 erected at a suitable height above ground on supports 13 to enable a shallow well 14, also provided with a refractory lining 15, to be incorporated in it at its lowest level for the collection and disposal of fluid materials. This well is shown as equipped with a pair of hinged drop bottom doors 16, 17 one overlapping the other in the closed position, and it has a suitably disposed slag hole and spout 18 and a tapping hole 19 for running off the molten metal and is in general similar to the well of an ordinary vertical shaft cupola.

The furnace chamber 10 extends horizontally for some distance beyond the well as seen in Figure 1 and is wider than the well in the section seen in Figure 2. The bottom plate 20 of the chamber beyond the well is also provided with drop down doors 21, 22 and above these doors and the bottom plate a bottom 23 of refractory material such as sand is placed which should slope gently towards the well 14. Above the level at which this bottom 23 is formed there are provided a number of evenly distributed openings or tuyères 24 passing through the side walls to the interior of the chamber 10. They are arranged at one or more levels and extend far enough up the furnace chamber side walls to maintain at incandescence a depth of coke or other fuel bed on the bottom 23 sufficient for the melting and superheating of the metal to be charged thereon. Nine tuyeres in each side wall are employed in the chamber in the illustrated example one of which on one side should blow at the centre of and adjacent the top of the well 14, see Figure 2. The tuyeres are supplied from air blast distributing conduits 25, which may if desired be supplied with preheated air from some form of heat interchange means (not shown) hereinafter referred to.

Remote from the foot of the sloping bottom 23 and partly above the top of the well 14 is a firebrick wall 26 dividing the end of the chamber 10 and forming an upward flue or passage 27; the entrance 28 to this flue is at about the level of the bottom 23 and its floor also slopes towards the well 14. The dividing wall 26 is arched over this entrance 28, the top of the arch 29 being most suitably formed at the height of the uppermost of the tuyeres 24.

The top of the arched dividing wall 26 is below the refractory lining of the roof of the furnace and preferably slopes downwardly toward the interior of the furnace chamber 10 as shown at 30. The roof above the vertical flue or passage 27 is also built as an arch and preferably sloping downwardly toward the furnace as at 31. This arched roof extends forwardly over the sloping top 30 of the wall 26 to form between them a readmission opening 32 into the furnace chamber 10 for the passage of the gases moving up the flue 27. An additional air admission is made at 34 where gases re-enter the chamber. This admission pipe or pipes 33 is directed toward the chamber at its discharge orifice, 34.

The opening 35 for charging fuel (such as coke) and the divided metal, which is to be melted, into the furnace chamber is preferably arranged in one of the longitudinal walls below the roof, and is provided with a suitable door 36. At 37 is shown an outlet for the products of combustion leading to the flue 38, and it will be noticed that this outlet 37 is slightly above the level of the readmission opening 32.

A heat-interchange arrangement for preheating the air for supply to the furnace chamber may be arranged in the flue 38. In the illustrated construction an air supply pipe 39 from the usual cupola fan (not shown) which is of considerable capacity supplies air through a pipe coil 40 within the flue 38. From the pipe coil the heated air is supplied to the air blast conduit 25 supplying the tuyère 24 and, if desired, also to the additional supply 33.

This heat interchange and products of combustion flue may be provided in a separate metal casing suitably lined and arranged between the cupola or furnace and the stack. Any other known form of heat interchange system may, however, be employed, and a separate fan for the supply of air to pipe 33 at the readmission point of the gases may be provided, if desired.

Successive charges of metal, solid fuel and flux are charged through the opening 35 onto the bed of incandescent coke on the refractory bottom 23 to a depth conditioned by the height of the top of the arched dividing wall below the readmission opening 32 from the vertical passage 27. The quantity of coke in each charge is proportioned to furnish sufficient heat to melt the metal and non metallic substances in the charge and to maintain the required height of the incandescent coke bed. Moreover a flux such as limestone is added to each charge in sufficient quantity to produce with waste products in the charge a fluid slag and thereby maintain clean conditions inside the furnace.

If desired we may add reagents active during the period that the charge is passing from the level of the charge opening 35 to the melting zone.

The air from the tuyères 24, producing incompletely burnt gases by its passage through the bed of incandescent coke on the refractory bottom 23, sweeps the gases horizontally to the entrance 28 at the base of the vertical flue or passage 27, up which passage they are carried to the readmission opening 32.

The readmission of the gases at 32, taking place slightly below the level of the outlet 37, causes the flame of the burning gases to sweep upwardly over the charged materials.

Completion of combustion takes place in the upper part of the furnace chamber 10 with the aid of the air supply at 34 and serves to add substantially to the heat utilised in the furnace, since the charge is thereby preheated immediately on entering the upper part of the furnace chamber and before passing down to the melting zone on the bottom 23 in the neighbourhood of the tuyères 24, so that both thermal efficiency and rate of melting are improved.

I claim:

1. A cupola furnace for melting metals in divided form comprising in combination a furnace chamber with means for charging fuel and metal therein and means for withdrawing molten metal and slag therefrom, a bottom for receiving said fuel and metal, a well below and to one end of the bottom and, above the well, means dividing the furnace chamber from an upwardly directed gas passage having an entrance to the passage opposite said bottom; means to supply air to the fuel layer on the bed providing a blast to sweep unburnt and partially burnt gases from the fuel into the entrance of the passage and readmission means for returning the gases to the upper part of the furnace chamber where they are burned in the presence of additional air and swept above the fuel and metal charged into the chamber.

2. A cupola furnace for melting metals in divided form comprising a furnace chamber with means for charging fuel and metal therein, a bottom of refractory substance in said chamber for receiving said fuel, said bottom sloping towards one end of the chamber where a well is formed from the chamber, a wall arranged above the well and serving to divide the furnace chamber from a vertical gas passage having an entrance opposite said bottom, a re-admission opening through said wall communicating with said passage, and means to supply air to the fuel above the bed to sweep unburnt and partially burnt gases from the fuel into the entrance of the passage and re-admission means for returning the gases to the upper part of the furnace chamber where they are burned in the presence of additional air and swept above the fuel and metal charged into the chamber.

3. A cupola furnace for melting metals in divided form comprising in combination a furnace chamber with means for charging fuel and metal therein, a bottom for receiving said fuel and metal, a well below and to one end of the bottom, means in said well for withdrawing molten metal from the furnace chamber and for withdrawing slag therefrom, a vertical gas passage above the well and separated from the furnace chamber for conveying unburnt and partially burnt gases from the fuel on the bottom to the upper part of the furnace chamber, air supply means for supporting combustion of fuel on the bottom and additional air supply means in the upper part of the furnace chamber in the neighbourhood of said gas passage, and an outlet from the upper part of the furnace chamber opposite the point where said vertical gas passage communicates with the upper part of the furnace chamber.

4. A cupola furnace for melting metals in divided form as claimed in claim 1 in which tuyère openings for the supply of air are arranged throughout a zone immediately above the level of the bottom, which zone is of a depth approximately equal to the depth of the entrance to the upwardly directed gas passage above the top of the well of the furnace chamber.

5. A cupola furnace for melting metals in divided form comprising a furnace chamber with means for charging fuel and metal therein, a bottom of refractory substance in said chamber for receiving said fuel, said bottom sloping towards one end of the chamber where a well is formed from the chamber, a wall arranged above the well and serving to divide the furnace chamber from a vertical gas passage having an entrance opposite said bottom, said division wall having a top surface sloping gradually down towards the furnace chamber, a re-admission opening between the sloping top of said wall and a roof over said passage and said wall, and means to supply air to this opening where it enters the upper part of the furnace chamber; an outlet from the furnace chamber opposite said opening above the division wall and at a slightly higher level than said opening so that the flames from the burning gas re-entering the upper part of the furnace chamber will sweep upward over the materials charged into said chamber.

6. A cupola furnace for melting metals in divided form comprising a furnace chamber having a sloping refractory bottom therein, means for charging fuel and metal into the upper part of said chamber and on to the bottom, a well for withdrawing molten metal and slag from the furnace chamber, a division wall at one end of the chamber with an entrance through an arch at the base of the wall to a passage leading to the upper part of the furnace chamber, an arched roof over an opening from said passage for re-admitting gases to the upper part of the furnace chamber, and means for supplying air throughout a zone immediately above said bed and also to the upper part of said furnace chamber where the re-admission opening is arranged and an outlet from the upper part of said furnace chamber opposite and at a slightly higher level than said re-admission opening.

7. A cupola furnace for melting metals in divided form comprising in combination a rectangular furnace chamber, a sloping refractory bottom for receiving a bed of fuel, a well carried below said sloping refractory bottom, a wall arched above the furnace chamber over the well and dividing the furnace chamber from an upright passage leading to the upper part of the furnace to which passage the arch of the wall provides an entrance for gases swept from the fuel bed, a re-admission opening above said wall between the passage and the upper part of the furnace chamber and an outlet from the upper part of the furnace chamber remote from said re-admission opening, an air supply means entering said furnace chamber at spaced intervals above said bottom and further air supply means entering the upper part of the furnace chamber adjacent the re-admission opening, where the products of incomplete combustion from the fuel bottom are swept through the arch into the gas passage and out of the way of freshly charged material entering the upper part of the furnace, and are re-introduced with air to complete combustion to form a hot upper zone above the fuel and metal in the furnace chamber.

8. A cupola furnace for melting metals in divided form as claimed in claim 1 wherein heat interchange means for heating the air supply to the fuel chamber prior to admission thereto is incorporated in a flue to which the products of complete combustion from the upper part of the furnace chamber are conveyed.

9. A cupola furnace for melting metals in divided form comprising in combination a rectangular furnace chamber, a sloping refractory bottom for receiving a bed of fuel, a well carried below said sloping refractory bottom, a wall arched above the furnace chamber over the well and dividing the furnace chamber from an upright passage leading to the upper part of the furnace to which passage the arch of the wall provides an entrance for gases swept from the bed of fuel upon the bottom, a re-admission opening above said wall between the passage and the upper part of the furnace chamber and an outlet from the upper part of the furnace chamber remote from said re-admission opening, an air supply means entering said furnace chamber along the sides thereof at spaced intervals above said bed and further air supply means entering the upper part of the furnace chamber adjacent the re-admission opening, an upwardly sloping outlet from the upper part of the furnace chamber to a flue in which air supply piping is coiled and from which air is led to conduits and supplied to the evenly spaced tuyères in the sides of said chamber, whereby the products of incomplete combustion from the bed of fuel are swept through the arch into the gas passage and out of the way of freshly charged material entering the upper part of the furnace, and are re-introduced with air to complete combustion to form a hot upper zone above the fuel and metal in the furnace chamber.

FREDERICK ARTHUR WOOLLEY.

REFERENCES CITED

The following references are of record in the file of this patent:

UNITED STATES PATENTS

| Number | Name | Date |
|--------|------|------|
| 35,276 | Fleury et al. | May 13, 1862 |
| 113,584 | Siemens | Apr. 11, 1871 |
| 282,265 | Bryant | July 31, 1883 |
| 515,727 | Bonehill | Feb. 27, 1894 |